(No Model.)

F. D. OWEN.
REAR FORK END FOR BICYCLES.

No. 553,313. Patented Jan. 21, 1896.

Witnesses
Sidney P. Hollingworth
Thomas C. Harris.

Inventor
Frederick D. Owen
by C. L. Neale
his Attorney

UNITED STATES PATENT OFFICE.

FREDERICK D. OWEN, OF WASHINGTON, DISTRICT OF COLUMBIA.

REAR-FORK END FOR BICYCLES.

SPECIFICATION forming part of Letters Patent No. 553,313, dated January 21, 1896.

Application filed July 15, 1893. Serial No. 480,599. (No model.)

*To all whom it may concern:*

Be it known that I, FREDERICK D. OWEN, a citizen of the United States, residing at Washington, in the District of Columbia, have invented certain new and useful Improvements in Rear-Fork Ends for Bicycles; and I do hereby declare the following to be a full, clear, and exact description of the invention, such as will enable others skilled in the art to which it appertains to make and use the same.

This invention relates to improvements in rear-driving safety-bicycles, and more particularly to what are known as the "rear-fork ends" of said bicycles. In bicycles of this class as heretofore constructed the rear-fork ends have usually been slotted horizontally to provide for taking up slack in the chain incidental to the wear of the chain and sprockets and to the stretch of the chain, and the removal of the rear wheel of such machines has involved the removal of the chain by the withdrawal of a screw-pintle connecting two of the links of the chain. This has occasioned great annoyance from the necessary soiling of the hands in removing the chain, and on the road the chain is apt to become clogged with dust and grit after removal, which not only grinds the chain and sprockets, but renders riding comparatively fatiguing and unpleasant.

The object of the invention is to so construct the rear-fork ends of such bicycles as to adapt the rear wheel for removal from the frame without removing the chain from the front or driving sprocket, thus admitting of said chain being supported by or suspended from the frame of the bicycle during any necessary repairs of the rear wheel or its bearings.

To this end the invention consists in the matters to be hereinafter described in detail, and then pointed out in the claims at the close of this specification.

Figure 1:
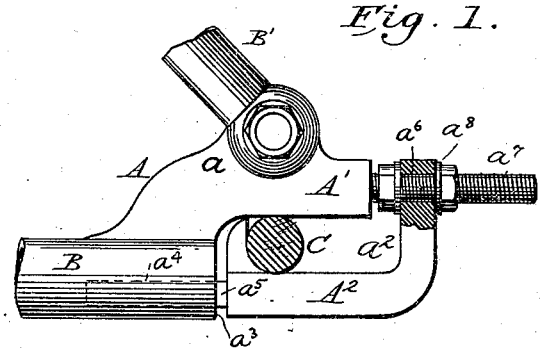
Figure 2:
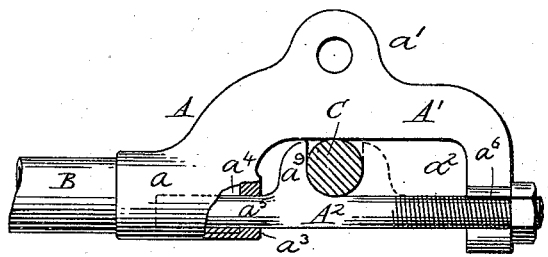
Figure 3:
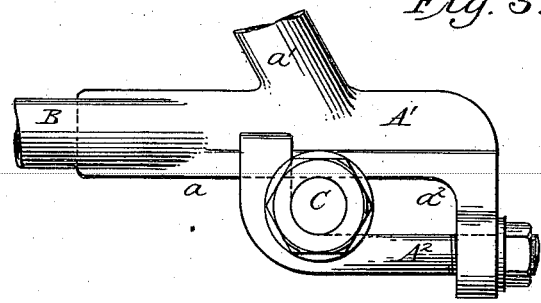

In the accompanying drawings, Figure 1 is a side elevation of a fork end embodying features of my invention. Figs. 2 and 3 are similar views showing slight variations in construction.

The rear-fork end, designated as a whole by the letter A, comprises a blank of metal, usually forged, the upper part or member, A', of which is provided with lugs $a$ and $a'$ for the attachment of said fork end to the rear forks B and brace-rods B'. As ordinarily constructed, the fork ends are provided with horizontal slots $a^2$ for the reception of the ends of the rear-wheel axle C, the rear part of the bicycle-frame, including the rear forks B and brace-rods B', being thereby supported upon the rear-wheel axle, as is well understood.

The slots $a^2$ of the fork ends are usually open at the rear end to provide for the removal and insertion of the rear-wheel axle; but it has been necessary with such construction, so far as I am aware, to remove the chain from the sprocket-wheels before said axle could be removed from the fork ends, and this operation has been of such a troublesome nature as to deter the average rider from removing the rear wheel from the frame, even though convinced that the rear-wheel bearings needed attention.

The purpose of my present invention is to so construct the rear-fork ends A of the frame as to adapt the rear-wheel axle for removal from the slots $a^2$ of said fork ends without disconnecting the chain. In constructing said rear-fork ends in accordance with my said invention the lower part, $A^2$, of the fork end A, constituting the bottom wall or side of said slot $a^2$, is made movable with relation to the upper part, A', of said fork end, as will hereinafter be explained, so that the rear axle C may be removed from the front end of the slot $a^2$ of the fork end A.

The end sought may be attained by any one of a number of constructions. The constructions shown in Figs. 1 and 2 involve the withdrawal of the front end of the lower wall $A^2$ of the slot $a^2$ from its engaging-aperture in the upper part, A', of the fork end. In Figs. 1 and 2 the upper part, A', of the fork end A consists of a forging having a depending shoulder $a^3$, which at front forms a stub or lug $a$, to which the rear end of the rear fork B is brazed. The rear face of the shoulder $a^3$ is provided with a socket $a^4$ to receive a stud $a^5$ projecting from the front end of the lower part or member, $A^2$, of the fork end, the rear end of said member $A^2$ being supported by connection with the rear end of the upper part or body, A', of the fork end.

In the form shown in Fig. 1 the lower member, $A^2$, of the fork end is L-shaped, the short arm at the rear end thereof being provided with an open-sided socket $a^6$ to receive a stud $a^7$ projecting from the rear end of the upper member of the fork end, said studs and sockets serving to insure the proper relations between the upper and lower members of the fork ends. The stud $a^7$ at the rear end of the upper member of the fork end has the form of a screw, and passes entirely through the short leg of the lower member, the parts being locked together by a clamp-nut $a^8$ threaded on the stud $a^7$. To release the axle the nut $a^8$ is turned on the stud $a^7$, its free end the upper L-shaped part of the lower member, $A^2$, of the fork end, said upper part then being turned down horizontally to free the engaging part from the axle, when said lower member, $A^2$, may then be drawn rearweardly, thus releasing the axle.

In Fig. 2 the upper member, $A'$, of the fork end is provided at its rear end with a depending leg apertured to receive the rear end of a screw-bolt. This screw-bolt constitutes the lower member, $A^2$, of the fork end, its forward end being seated in the socket $a^4$. Projecting laterally from the screw-bolt is a hook $a^9$ designed to engage the rear axle C, so that said screw-bolt may serve as a chain-adjuster. The hook $a^9$ may have the form of an ear, provided with a vertical slot to receive the rear axle C, thereby providing for the positive adjustment of said axle in both directions. To remove the rear axle C from the slot $a^2$, the clamp-nut at the rear end of the screw-bolt is loosened to slack the chain, the hook $a^9$ being then turned outward free from the axle C, when the screw-bolt may be withdrawn from the socket $a^4$ and the axle C be dropped from the slot $a^2$.

In Fig. 3 I also show means for removing the wheel and axle from the bottom of the retaining-slot $a^2$ by revolving the lower wall $A^2$ in its end support, as already described with relation to Fig. 3. This arm $A^2$, with hook at forward end, is held fast against the upper wall forward of the axle by engaging a lip or projecting edge on same when properly adjusted by the axle-nut. To remove the wheel and axle, the nut is loosened and the armed hook revolved outward and over, thereby allowing the removal of the axle from the forward end of the slot, as in other cases.

The slot $a^2$ of the rear-fork end has been, for convenience, herein designated as a "horizontal" slot; but it will be understood that these adjusting-slots, in practice, are rarely in a true horizontal plane, being more often at a slight angle to a horizontal line.

What I claim is—

1. A rear fork end for rear driving safety bicycles, comprising a body having an elongated slot within which a rear axle may be adjusted forward or rearward, the lower wall of said slot being adjustable lengthwise and shaped to partly embrace an axle, and being movable to open the forward end of the slot; whereby an axle may be either adjusted lengthwise of the slot or removed from the forward end thereof by movement of said lower wall, substantially as described.

2. A rear fork end for bicycles comprising a body of metal provided with a longitudinal slot within which a wheel axle may be adjusted, one of the walls of said slot being revoluble and movable longitudinally, and provided with means to partly embrace a wheel axle, substantially as described.

3. A slotted rear fork end for rear driving safety bicycles consisting of a member to be fixed to a bicycle frame and constitute one wall of an elongated slot, and a longitudinally movable member supported by the fixed member and constituting the other wall of said slot, said movable member being provided with a hook or projection which may stand across the slot formed by said fixed and movable members and partly embrace a wheel axle or be turned laterally to release said axle, substantially as described.

4. A rear fork end for bicycles comprising a two part body of metal the members of which form the opposite walls of an axle receiving slot, the lower member being movable to open said slot, and being threaded and provided with a hook to engage an axle, and a nut to adjust said movable member longitudinally, substantially as described.

5. A rear fork end for bicycles comprising a two part body the members of which form the opposite walls of a longitudinal slot, one of said members being provided with an opening within which the other member is movable longitudinally, and one of said members being threaded, the movable member of said fork end being provided with a hook to engage an axle, and an adjusting nut seated upon the threaded member, substantially as described.

6. A rear fork end for bicycles comprising a two part body forming the opposite walls of a longitudinal slot, the upper member being provided with an opening within which the lower member may be seated and adjusted longitudinally, said lower member being threaded and provided with a hook to engage an axle, and an adjusting nut threaded upon the lower movable member and adapted to bear against the fixed member, substantially as described.

In testimony whereof I affix my signature in presence of two witnesses.

FREDERICK D. OWEN.

Witnesses:
HENRY E. COOPER,
C. M. DULAN.